US012759572B2

(12) United States Patent
Langlois et al.

(10) Patent No.: US 12,759,572 B2
(45) Date of Patent: Oct. 13, 2026

(54) STEERING WHEEL INDICATOR FOR INDICATING CHANGE IN STATUS OF AUTONOMOUS DRIVING LEVEL

(71) Applicants: RENAULT S.A.S., Boulogne Billancourt (FR); VALEO COMFORT AND DRIVING ASSISTANCE, Creteil (FR)

(72) Inventors: Sabine Langlois, Paris (FR); Alexandre Joannides, Creteil (FR); Jean-Marc Tissot, Creteil (FR)

(73) Assignees: RENAULT S.A.S., Boulogne Bilancourt (FR); VALEO COMFORT AND DRIVING ASSISTANCE, Creteil (FR)

( * ) Notice: Subject to any disclaimer, the term of this patent is extended or adjusted under 35 U.S.C. 154(b) by 293 days.

(21) Appl. No.: 18/258,162

(22) PCT Filed: Dec. 3, 2021

(86) PCT No.: PCT/EP2021/084130

§ 371 (c)(1),
(2) Date: Jun. 16, 2023

(87) PCT Pub. No.: WO2022/128528

PCT Pub. Date: Jun. 23, 2022

(65) Prior Publication Data

US 2024/0067202 A1 Feb. 29, 2024

(30) Foreign Application Priority Data

Dec. 17, 2020 (FR) ..................................... 20 13412

(51) Int. Cl.
*B60W 50/14* (2020.01)
*B60K 35/22* (2024.01)
(Continued)

(52) U.S. Cl.
CPC ............. *B60W 50/14* (2013.01); *B60K 35/22* (2024.01); *B60K 35/60* (2024.01); *B60W 60/005* (2020.02);
(Continued)

(58) Field of Classification Search
CPC ............... B60W 50/14; B60W 60/005; B60W 2540/229; B60W 60/0053;
(Continued)

(56) References Cited

U.S. PATENT DOCUMENTS

2014/0081521 A1* 3/2014 Frojdh ................... B60K 35/10 701/36
2016/0185387 A1* 6/2016 Kuoch .................. B60W 50/14 701/41

(Continued)

FOREIGN PATENT DOCUMENTS

CN 105517873 A 4/2016
DE 10 2017 208 504 A1 11/2018
FR 3 045 546 A1 6/2017

OTHER PUBLICATIONS

International Search Report issued Mar. 2, 2022 in PCT/EP2021/084130 filed on Dec. 3, 2021, 2 pages.

(Continued)

*Primary Examiner* — Abdhesh K Jha
*Assistant Examiner* — Alexander George Matta
(74) *Attorney, Agent, or Firm* — Oblon, McClelland, Maier & Neustadt, L.L.P.

(57) ABSTRACT

A control system is for a motor vehicle to be driven according to a manual mode or according to various levels of driving automation by an automated driving module. The control system includes a driving assistance device and a steering control member. The steering control member includes at least one indicator light and the driving assis-
(Continued)

tance device changes the status of the at least one indicator light when the driving assistance device determines an available level of driving automation, detects an active level of driving automation, determines as a function of the road configuration that the motor vehicle should be driven by the driver, and detects a switch between a level of driving automation and the manual mode.

10 Claims, 7 Drawing Sheets

(51) Int. Cl.

| | |
|---|---|
| ***B60K 35/25*** | (2024.01) |
| ***B60K 35/26*** | (2024.01) |
| ***B60K 35/28*** | (2024.01) |
| ***B60K 35/60*** | (2024.01) |
| ***B60W 60/00*** | (2020.01) |
| ***B62D 1/08*** | (2006.01) |

(52) U.S. Cl.
CPC ................ *B62D 1/08* (2013.01); *B60K 35/25* (2024.01); *B60K 35/26* (2024.01); *B60K 35/28* (2024.01); *B60K 2360/175* (2024.01); *B60K 2360/349* (2024.01); *B60K 2360/782* (2024.01)

(58) Field of Classification Search
CPC ........ B60W 2050/146; B60W 60/0051; B60K 35/00; B60K 35/28; B60K 35/60; B60K 2360/175; B60K 2360/349; B60K 2360/782; B60K 35/26; B60K 35/22; B60K 35/25; B60K 2360/336; B60K 2360/338; B60K 35/285; B60K 35/29; B60K 35/10; B60K 2360/172; B60K 2360/186; B60K 2360/188; B60K 2360/332; B62D 1/08; B62D 1/046; B62D 15/025
See application file for complete search history.

(56) References Cited

U.S. PATENT DOCUMENTS

| | | | | |
|---|---|---|---|---|
| 2017/0106786 | A1* | 4/2017 | Ebina | G08B 5/36 |
| 2017/0144593 | A1* | 5/2017 | Gascón Rivera | B60K 35/60 |
| 2017/0166116 | A1* | 6/2017 | Asakawa | B60K 35/28 |
| 2019/0135305 | A1* | 5/2019 | Laine | B60K 35/10 |
| 2020/0023830 | A1* | 1/2020 | Breisinger | B60W 60/0051 |
| 2020/0086907 | A1* | 3/2020 | Breisinger | B60K 35/81 |
| 2020/0262340 | A1 | 8/2020 | Prill | |
| 2020/0273429 | A1* | 8/2020 | Broy | B60K 35/29 |
| 2021/0101639 | A1* | 4/2021 | Chiu | B60Q 3/283 |
| 2024/0294115 | A1* | 9/2024 | Komatsu | B60R 1/25 |

OTHER PUBLICATIONS

Combined Chinese Office Action and Search Report issued Mar. 28, 2026, in corresponding Chinese Patent Application No. 202180091543.7 (with English Translation and English Translation of Category of Cited Documents), 14 pages.

* cited by examiner

STEERING WHEEL INDICATOR FOR INDICATING CHANGE IN STATUS OF AUTONOMOUS DRIVING LEVEL

BACKGROUND

The present invention lies in the field of motor vehicles referred to as semi-autonomous or autonomous. The invention relates to a control system for controlling the motor vehicle manually or in automated or semi-automated fashion. The invention also relates to a motor vehicle fitted with such a control system. Traditionally, motor vehicles are driven in a manual mode by a user, who must perform all the operations of controlling their vehicle and checking their surroundings.

It is known to fit motor vehicles with control systems comprising cruise control devices and automated management modules that make it possible to control the vehicle to carry out one or more maneuvers in automated or semi-automated fashion, that is to say without intervention, or with reduced intervention, by the driver. Mention may be made, for example, of speed regulators and distance-controlling systems, which allow the driver to offload some of their driving activity, or else parking assistance systems which assist the driver in parking the vehicle.

Such systems are currently widespread on the market and their functionalities are gradually being associated with one another to increase the automation of motor vehicles. All these functionalities overall share the objective of providing the driver of the motor vehicle with the option of having a different activity to the driving of the vehicle, or relaxing while the vehicle is moving, for example using various multimedia or infotainment systems, or performing another leisure activity such as reading.

The driver can thus benefit from delegation of the driving for all or some of the duration of their journey. On a scale proposed by the international organization "SAE International", formerly Society of Automotive Engineers, multiple levels of automation for driving a vehicle are conceived. Level "one" provides automated assistance for longitudinal control or lateral/transverse control for following white lines under the supervision of the driver. Level "two" provides automated assistance both for longitudinal control and lateral control of the motor vehicle V, and the driver supervises. The third level and up involve a semi-automated or automated mode. Level "three" provides automation in certain predefined conditions, for example on a motorway, and level "four" provides a greater level of automation, without assistance by the driver in authorized cases. The driver is then liberated from the task of supervision of the driving, notably monitoring for dangers, road signs, and other things. They may put their feet where desired, release the wheel, look away from the road to rest, read or do something else. Level "five" corresponds to a high level of automation without assistance by the driver. Motor vehicles that are currently on the market provide systems for partial automation of the driving. Depending on country regulations, automated management modules will be able to increasingly take on responsibility for driving, notably according to the third and fourth levels on the scale cited above, corresponding to an increasingly important role of automated assistance.

However, the driver risks not always being able to clearly identify the driving state, that is to say if a level of driving automation is active or not, or if the driver must supervise the driving. It is important to be able to indicate to the driver at any time where the responsibility for driving lies, whether with the driver or the automated management module, avoiding the driver having to look away from the roadway setting.

In addition, when a transfer of responsibility for driving is prescribed, that is to say that the driving changes from manual control to automated control or vice versa, the changeover in progress is not actualized, such that the driver may incorrectly think that the transfer of responsibility for driving is finished or not.

Furthermore, in a semi-automated or automated mode, it is also necessary to alert the driver clearly when limit operating conditions are detected that run the risk of disengagement of the automated management module.

BRIEF SUMMARY

The aim of the invention is to at least partially overcome one or more of the drawbacks of the prior art by proposing a control system for centrally and unambiguously indicating the information linked to the driving automation to the driver. The aim of the invention is to allow the driver to know when a level of driving automation is active or can be activated. Another aim of the invention is to reliably alert the driver when they must retake charge of the driving. Yet another aim of the invention is to provide a clear indication when a changeover in responsibility for driving between the driver and the automated management module is in progress and when the transfer of responsibility for driving has taken place.

To that end, an object of the invention is a system for controlling a motor vehicle configured to be driven in a manual mode by a driver without automated assistance or in different levels of driving automation by means of an automated management module of the control system. The control system has a driving assistance device configured to analyze a road configuration of the motor vehicle so as to determine if a level of driving automation is available and to detect an active level of driving automation. The control system also has a steering control member for controlling the steering of the motor vehicle. According to the invention, the steering control member has at least one indicator light. The driving assistance device is configured to modify the state of said at least one indicator light:

a. when the driving assistance device determines an available level of driving automation, so as to indicate the available level of driving automation that was determined, and
b. when the driving assistance device detects an active level of driving automation, so as to indicate the active level of driving automation that was detected, and
c. when the driving assistance device determines, depending on the road configuration, that the motor vehicle must be driven by the driver, so as to indicate at least one request for manual driving of the motor vehicle, and
d. when the driving assistance device detects a switchover between a level of driving automation and the manual mode, so as to indicate a changeover in responsibility for driving between the automated management module and the driver.

All the information regarding the responsibility for driving, between the human driver and the automated management module, but also a transfer of responsibility for driving that is in progress (that is to say during the changeover), and when the human driver must retake charge of the motor vehicle, are indicated on the same steering control member without needing to use other elements, for example of the driver's station in the motor vehicle.

The control system may moreover have one or more of the following features described below, taken individually or in combination.

The steering control member may have at least one first indicator light configured to indicate the available or active level of driving automation, one second indicator light configured to indicate said at least one request for manual driving, and one third indicator light for indicating the changeover in responsibility for driving.

The driving assistance device is configured to modify the state of at least one of the indicator lights. Notably, the driving assistance device is configured to modify the state of said at least one first indicator light when the driving assistance device determines an available level of driving automation, so as to indicate the available level of driving automation that was determined.

The driving assistance device is configured to modify the state of said at least one first indicator light when the driving assistance device detects an active level of driving automation, so as to indicate the active level of driving automation that was detected.

The driving assistance device is configured to modify the state of said at least one second indicator light when the driving assistance device determines, depending on the road configuration, that the motor vehicle must be driven by the driver, so as to indicate at least one request for manual driving of the motor vehicle.

The driving assistance device is configured to modify the state of said at least one third indicator light when the driving assistance device detects a switchover between a level of driving automation and the manual mode, so as to indicate a changeover in responsibility for driving between the automated management module and the driver.

In particular, the steering control member may have at least one first region provided with the first indicator light, one second region provided with the second indicator light, and one third region provided with the third indicator light. This makes it possible to give a clear and distinct indication for each item of information that is to be transmitted to the driver. The use of the control system is thus more intuitive for the driver.

The steering control member is for example a steering wheel. The steering wheel may have a hub provided with said at least one first indicator light, a peripheral ring provided with said at least one second indicator light, and at least one arm which connects the hub to the peripheral ring and is provided with said at least one third indicator light. The information indicated on the steering wheel can be easily seen by the driver.

Said at least one indicator light or at least one of the indicator lights may have a series of light-emitting diodes forming a lighting strip.

Said at least one indicator light or at least one of the indicator lights may have at least one light source configured to emit different colors of light. The driving assistance device is configured to manage the illumination of said at least one indicator light in a predefined color code.

Said at least one indicator light or at least one of the indicator lights may have at least one light source of variable intensity. According to one embodiment, the driving assistance device is configured to manage the lighting of said at least one indicator light, for example said at least one first indicator light, with a first light intensity when a level of automation is available and with a second intensity, different than the first intensity, when a level of automation is active.

According to another embodiment, the driving assistance device is configured to manage the lighting of said at least one indicator light, for example said at least one third indicator light, with a light intensity that changes during a changeover in responsibility for driving.

The driving assistance device is advantageously configured to manage the illumination of at least one indicator light in at least one lighting display sequence.

According to a particular aspect, the driving assistance device is configured to manage the illumination of at least two indicator lights in different lighting display sequences. The driving assistance device may be configured to manage the illumination of said at least one first indicator light in a lighting display sequence when a level of driving automation is available. The driving assistance device may be configured to manage the illumination of said at least one second indicator light in another lighting display sequence when the driving assistance device determines that the motor vehicle must be driven by the driver.

The driving assistance device is advantageously configured to manage the illumination by making said at least one indicator light flash at different frequencies.

According to one particular embodiment, the driving assistance device may be configured to manage the illumination by making said at least one first indicator light flash at a first frequency when a level of driving automation is available.

The driving assistance device may be configured to manage the illumination of said at least one second indicator light by making it flash at a second frequency when the driving assistance device determines that the motor vehicle must be driven by the driver. The second frequency may be greater than the first frequency.

The driving assistance device may be configured to manage the static illumination of said at least one indicator light.

Advantageously, the driving assistance device is configured to manage at least one lighting display sequence of said at least one indicator light or of at least one of the indicator lights, representing the changeover in responsibility for driving. The driving assistance device may be configured to manage a first lighting display sequence. Said at least one indicator light may form a light path in a first direction, associated with a changeover in responsibility for driving from the driver to the automated management module. The driving assistance device may be configured to manage a second lighting display sequence. Said at least one indicator light may form a light path in a second direction, associated with a changeover in responsibility for driving from the automated management module to the driver. Said light path may at least partially take one of the following shapes: linear, circular.

According to one embodiment, the driving assistance device is configured to manage a lighting display sequence of said at least one indicator light with a light intensity that changes during the changeover in responsibility for driving until it reaches a predefined light intensity when the changeover in responsibility for driving is complete. The light intensity may get stronger or weaker during the changeover in responsibility for driving.

Advantageously, the control system has at least one control member for selecting a level of driving automation. This is preferably a control member on the steering wheel.

According to one aspect, the driving assistance device may be configured to generate at least one warning in addition to changing the state of the indicator light, such as a visual warning and/or an audible warning and/or a warning by giving haptic feedback. The control system may have a device for providing an audible warning and/or a device for providing a warning by giving haptic feedback and/or a display device. The display device may be selected from a heads-up display, a display on the control panel, a display on the dashboard.

The invention also relates to a motor vehicle which is configured to be driven in a manual mode by a driver without automated assistance or in different levels of driving automation and which has a control system as defined above.

BRIEF DESCRIPTION OF THE DRAWINGS

Other advantages and features of the invention will become more clearly apparent from reading the following description, which is given by way of illustrative and non-limiting example, and the appended figures, in which.

DETAILED DESCRIPTION

In the figures, identical elements bear the same reference numbers.

The following embodiments are examples. Although the description refers to one or more embodiments, this does not necessarily mean that each reference relates to the same embodiment, or that the features apply only to a single embodiment. Single features of different embodiments can also be combined or interchanged to provide other embodiments.

In the description, certain elements may be indexed, for example first element or second element. In this case, this is simply indexing to differentiate and designate elements that are similar but not identical. This indexing does not imply priority being given to one element over another and such designations can be easily interchanged without departing from the scope of the present description. Neither does this indexing imply any chronological order.

Figure 1:
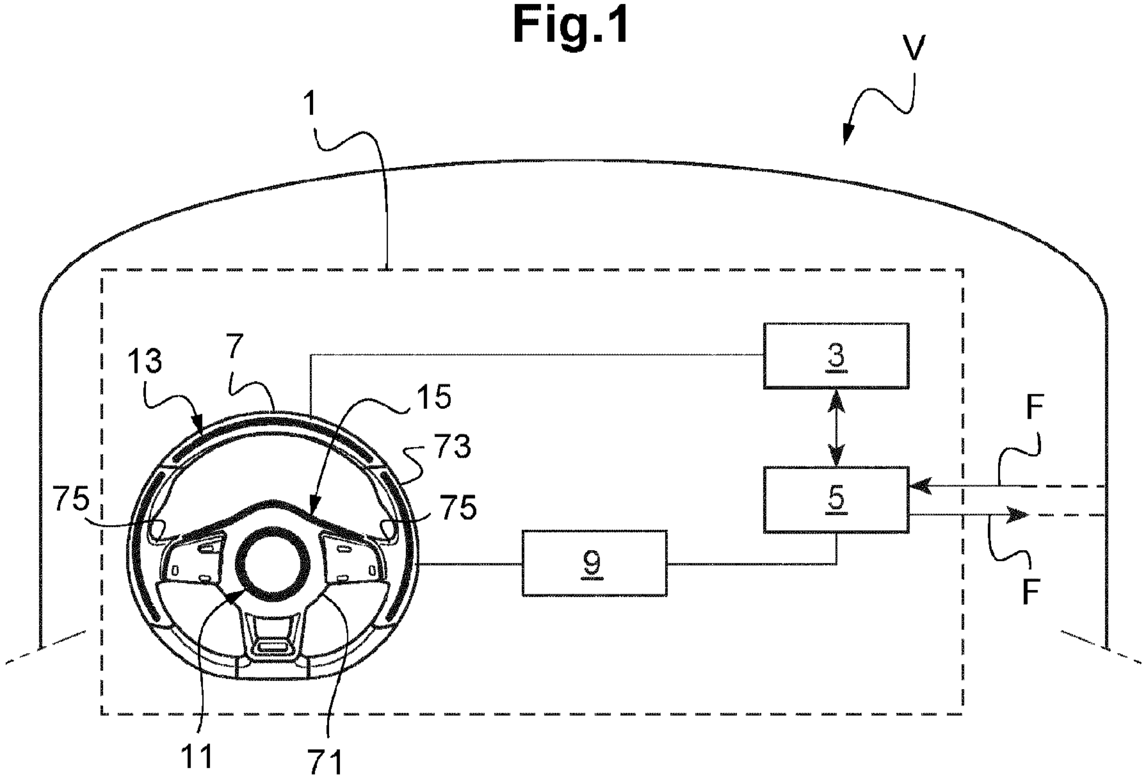
FIG. 1 very schematically depicts the interaction between various elements of a control system according to the invention with which a motor vehicle is fitted.

The invention relates to a control system 1 intended to be fitted to a motor vehicle V, only part of which is depicted very schematically in FIG. 1. The motor vehicle V is for example a car, but it may also be another type of vehicle, such as a truck, or a bus. The motor vehicle V may be driven in a manual mode by a driver without automated assistance. In addition, this involves a motor vehicle V referred to as autonomous or semi-autonomous, that is to say also capable of assisting the driver in certain maneuvers or performing all or some of the driving in a mode referred to as automated or semi-automated.

It is possible to provide multiple different levels of driving automation, for example three, four, or even five levels, which provide increasing levels of automation. The levels of automation are classified from the lowest level of automation to the highest, that is to say the one providing the most assistance. The human intervention and supervision required decrease as the levels of automation increase. As a result, the motor vehicle V may be driven in a manual mode with zero automation, which can also be referred to as level zero, or in one or the other of the levels of driving automation, for example from one to five in accordance with the proposition for a scale from the international organization "SAE International". To that end, the control system 1 may notably comprise at least one processor or a computer or a calculator on board the motor vehicle V. The control system 1 has one or more processing means for managing the automation of the driving.

In particular, the control system 1 has an automated management module 3, a driving assistance device 5, and a steering control member 7 for controlling the steering of the motor vehicle V. The driver is human, by contrast to the automated management module 3.

One or more elements of the control system 1 may exchange data and comprise corresponding communication means for this. The communication can be done for example via a CAN, or controller area network, without being limited to such a network.

The automated management module 3 is configured to manage the automation of the driving. In other words, it makes it possible to drive the motor vehicle V. More specifically, it makes it possible to manage one or more actuators, which are known from elsewhere, for automatically controlling the motor vehicle V to perform maneuvers in automated or semi-automated fashion. The automated management module 3 is therefore connected to such actuators so as to control steering members and drive members of the motor vehicle V. For example, at the fourth level, the automated management module 3 can make all the decisions relating to the driving of the vehicle, that is to say at least one simultaneous control of the braking, acceleration and steering of the vehicle.

The automated management module 3 may be controlled by the driving assistance device 5. The driving assistance device 5 is configured to exchange data with the automated management module 3.

In general, the driving assistance device 5 has one or more processing means for identifying a road configuration, for determining, depending on the road configuration that was identified, at least one suitable level of driving automation or if the driver must manually drive the motor vehicle V, for detecting an active level of driving automation and for detecting a switchover, notably between a level of driving automation and the manual mode.

As schematically shown by the arrows F partially in dashed line in FIG. 1, the driving assistance device 5 is able to communicate with various equipment or apparatuses (not depicted in the figures). Notably, the driving assistance device 5 can communicate with detection means or sensors on board the motor vehicle V, or remote systems.

In particular, the driving assistance device 5 can receive one or more data indicative of a road configuration. The road configuration relates to the roadway setting in which there is the motor vehicle V, other users of the roadway setting, such as vehicles or pedestrians, road signs, possible animals, or obstacles present in the roadway setting. Such data about the roadway setting can have been collected by one or more sensors. The road configuration may also relate to roadway conditions, such as weather conditions like rain, snow or the presence of ice on the road. These data relating to the roadway conditions can come from sensors on board the motor vehicle V or centralized databases for example.

As an alternative or in addition, the driving assistance device 5 may receive geolocation data. The driving assistance device 5 can analyze one or more of the data received, and identify the road configuration on the basis of these data.

The driving assistance device 5 can also receive one or more data indicative of a state of the user, for example coming from at least one on-board sensor such as a DMS, or "driver monitoring system", sensor and analyze the data received to identify for example if the driver is sleepy or distracted or, by contrast, if they are awake and concentrating. The state of the driver can be taken into account by the driving assistance device 5 to actively modulate the indication of an available level of automation.

Furthermore, the driving assistance device 5 may be connected to a control member 9 of the control system 1. This control member 9 is intended to be used, handled, by the driver to select and change the level of driving automation. It may be arranged in the motor vehicle V, at any location judged to be practical and ergonomic for the driver to actuate it. For example and non-limitingly, this may be a control on the steering wheel, in the area of the steering column switches, on the control panel, close to the gearshift lever, or any other adequate location selected by the automotive manufacturer. According to one alternative, it is conceivable for the control member 9 to be realized by a tactile surface, such as a touchscreen.

The driving assistance device 5 can receive data indicative of a level of driving automation activated by the driver via the control member 9. The driving assistance device 5 can thus detect a switchover between the manual mode and a level of driving automation, and between the levels of driving automation.

The driving assistance device 5 is configured to exchange at least one datum relating to a level of driving automation that has been selected and validated via the control member 9 with the automated management module 3.

The driving assistance device 5 therefore knows the driving state of the motor vehicle V, that is to say if the driver is driving the motor vehicle V manually or with automated assistance from the automated management module 3 according to one of the levels of automation.

The driving assistance device 5 can then receive data indicative of a torque exerted on the steering wheel and/or a torque exerted on a brake pedal or accelerator pedal.

The driving assistance device 5 is programmed to generate one or more warning signals for the driver. This in particular involves visual warnings, notably by way of illuminated signs on the steering control member 7, as described below. In addition, the driving assistance device 5 can generate an audible warning or a warning by giving haptic feedback. To this end, the control system 1 may have a device for providing an audible warning and/or a warning by giving haptic feedback. The haptic feedback can be given at the steering control member 7. Other visual warnings can be envisaged to display information, for example text. To this end, the control system 1 may have a display device enabling a heads-up display and/or a display arranged on the control panel and/or on the dashboard.

In particular, the driving assistance device 5 can generate a warning command relating to the following information. When it determines a level of driving automation that can be adopted, it can generate a command to indicate the available level of driving automation that was determined. When it detects an active level of driving automation, it can generate a command to indicate this active level of automation. When it determines, depending on the road configuration, that the motor vehicle must be driven by the driver, it can generate a command to indicate at least one request for manual driving of the motor vehicle V. When it detects a switchover between a level of driving automation and the manual mode, it can generate a command to indicate a changeover in responsibility for driving between the automated management module 3 and the driver.

The steering control member 7 can be controlled by the driver when the motor vehicle V is driven manually or by the automated management module 3 when a level of automation is active, notably from the third level of automation.

This steering control member 7 is advantageously intended to be disposed in the field of view of the driver in the passenger compartment of the motor vehicle V. In the examples illustrated, it is a steering wheel. Other steering control members can be envisaged, such as, non-exhaustively, a joystick, a knob or a lever. Such members are advantageously arranged ergonomically in the motor vehicle V to facilitate actuation by the driver and so as to be in the field of view of the driver.

In particular, the steering control member 7 has at least one first region, one second region, and one third region. The first region may be a central region, the second region a peripheral region, and the third region an intermediate region between the other two. According to the example of the steering wheel, the first region is a hub 71, the second region is a peripheral ring 73, and the third region is realized by at least one arm 75, for example two arms 75, connecting the hub 71 to the peripheral ring 73. Each region 71, 73, 75 can be associated with the indication of at least one predefined item of information to the driver.

The steering control member 7, such as the steering wheel, has at least one indicator light 11, 13, 15. The one or more indicator lights 11, 13, 15 are intended to be activated or turned on statically or by being made to flash or change color, so as to alert the driver. The one or more indicator lights 11, 13, 15 are provided to indicate an available level of driving automation, an active level of driving automation, at least one request for manual driving of the motor vehicle, and a changeover in responsibility for driving. Advantageously, multiple indicator lights 11, 13, 15 may be provided, each being associated with indicating at least one predefined item of information to the driver.

In particular, the first region, such as the hub 71 of the steering wheel, is provided with at least one first indicator light 11. It can indicate an available level of driving automation or an active level of driving automation.

The second region, such as the peripheral ring 73 of the steering wheel, is provided with at least one second indicator light 13. It may indicate at least one request for manual driving. This second indicator light 13 may be configured to indicate to the driver where they must place their hands. Of course, the driver may also retake charge of the motor vehicle V in manual mode on their own initiative, at any time, without waiting for such a request.

The third region, for example realized by the one or more arms 75 connecting the hub 71 to the peripheral ring 73 of the steering wheel, may be provided with at least one third indicator light 15. It may indicate a changeover in responsibility for driving.

The one or more indicator lights 11, 13, 15 comprise at least one light source. The light source may emit different colors of light so as to enable a luminous indication in a predefined color code. The light source may be of variable intensity, for example so as to elicit a more or less fast or urgent response from the driver depending on the intensity.

The one or more indicator lights 11, 13, 15 may respectively have at least one series of light-emitting diodes forming a lighting strip.

They may comprise a translucent or light-transmissive material associated with the light source. The series of light-emitting diodes may for example be embedded in such a translucent or light-transmissive material.

Each indicator light 11, 13, 15 may have a continuous geometric shape or alternatively may be formed of multiple discontinuous segments. According to the illustrated examples, the first indicator light 11 (FIGS. 2*a*, 2*b*) and the third indicator light 15 (FIG. 4) are continuous whereas the second indicator light 13 (FIG. 3) has multiple discontinuous segments 131, for example three segments 131.

Figure 2A:
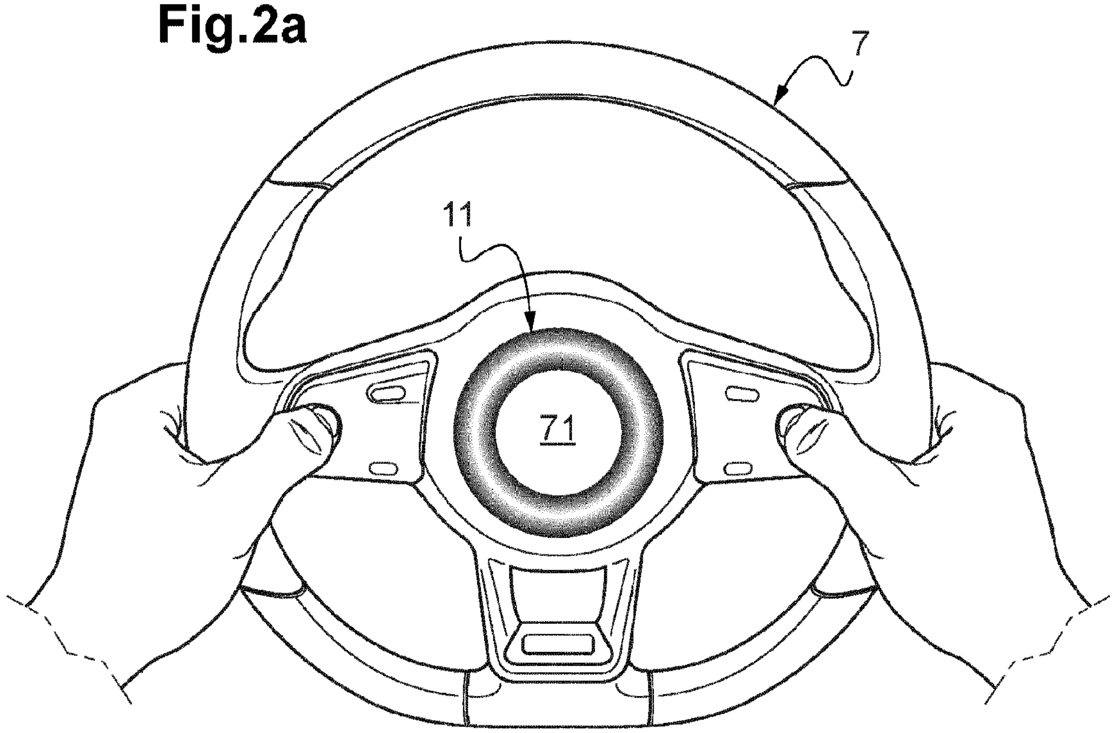
FIG. 2*a* shows a steering wheel of the motor vehicle with a first indicator light in a state of indicating an available level of driving automation.
Figure 2B:
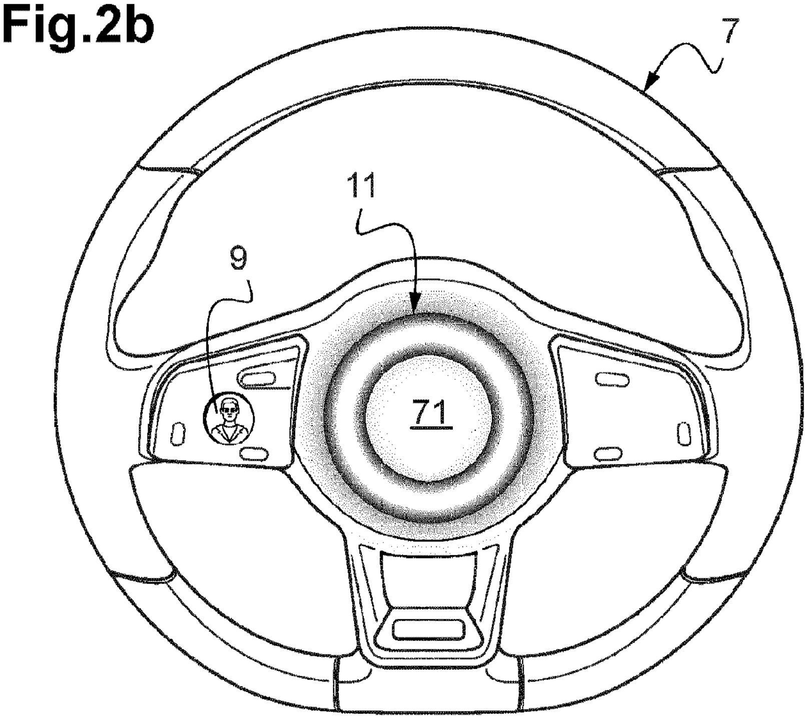
FIG. 2*b* shows the steering wheel with the first indicator light in a state of indicating an active level of driving automation.

In particular, the or each indicator light 11, 13, 15 (FIGS. 2*a* to 4) may define a luminous surface of greater or lesser extent. Its shape may be adapted to that of the steering control member 7, such as the steering wheel. The shape of the indicator light or each indicator light 11, 13, 15 notably follows the shape or the contour of the associated region 71, 73, 75, that is to say at the level at which it is arranged. Non-limitingly, at least one indicator light may have an at least partially circular overall shape. This is the case, for example, as depicted in FIGS. 2*a*, 2*b*, for the circular first indicator light 11 provided, in the example of the steering wheel, on the hub 71 which may be circular.

When an indicator light comprises a set of luminous segments, their shape can also be complementary to that of the steering control member 7 and in particular of the associated region. This is the case, notably in the example of FIG. 3, for the second indicator light 13 having multiple, in this instance three, luminous segments 131. The luminous segments 131 form arcs of a circle following the curve of the peripheral ring 73 of the steering wheel.

Figure 4:
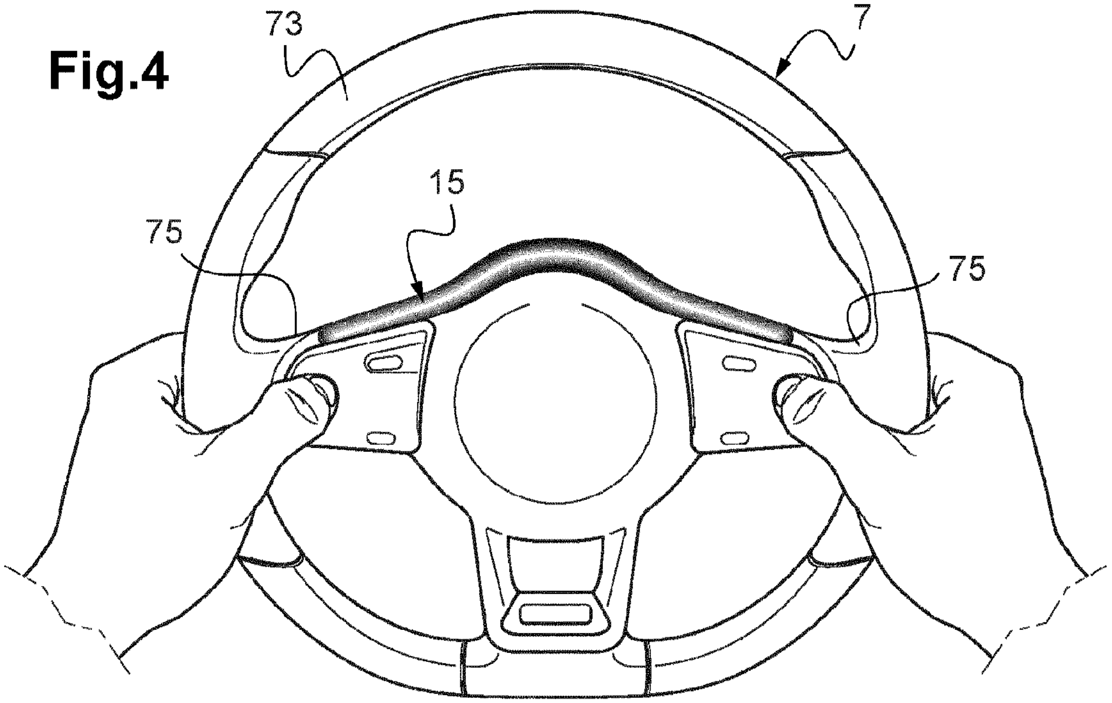
FIG. 4 shows the steering wheel with a third indicator light in a state of indicating a changeover in responsibility for driving.

In addition, in the example of the steering wheel from FIG. 4, the shape of the third indicator light 15 follows the shape of the one or more arms 75 forming the third region and in the center it follows part of the contour of the hub 71.

The driving assistance device 5 is configured to modify the state of one or more indicator lights 11, 13, 15. In manual mode, while the driver keeps charge of the steering wheel, the indicator lights 11, 13, 15 are not intended to be turned on.

The driving assistance device 5 can manage the illumination of one or more indicator lights 11, 13, 15 in a predefined color code. It can manage the illumination of a given indicator light 11, 13, 15 in different colors depending on the information to be indicated. It may also manage the illumination of multiple indicators 11, 13, 15 in different colors at the same time. For example, the driving assistance device 5 can manage a set of lights of different colors depending on the level of driving automation which is active or available, or in the case of a request for manual driving. The color of light can also differ when the driving assistance device 5 detects that the vehicle approaches a zone of disengagement of the automated management module 3 (this is possible notably from the second level) and depending on the time or the distance remaining before the automated management module 3 disengages. In other words, the state of one or more indicator lights 11, 13, 15 can be modified when the vehicle approaches limit operating conditions of the semi-automated or automated mode (like a roadworks area, or a toll area). One or more thresholds may be associated with the limit operating conditions. The color can vary depending on the threshold that is crossed.

The driving assistance device 5 may manage the static lighting of one or more indicator lights 11, 13, 15. The static lighting is for example indicative of an active level of automation. With reference to the particular example of FIG. 2*b*, the first indicator light 11 on the hub 71 is turned on in static fashion when a level of automation is active.

The driving assistance device 5 may manage the lighting of one or more indicator lights 11, 13, 15 by making it or them flash. This makes it possible to indicate that an action is expected from the driver.

This is the case notably for a request for manual driving. With reference to the particular example of the steering wheel that is shown schematically in FIG. 3, the second indicator light 13 on the peripheral ring 73 can flash in order to prompt the driver to put their hands back on the steering wheel. The request for manual driving can be activated if, in manual mode, the driver removes their hands from the steering wheel, and until they put their hands back on the steering wheel. As an alternative, the request for manual driving can be activated if the driving assistance device detects, notably depending on the road configuration, that the driving must change over from a semi-automated or automated mode to the manual mode.

The driving assistance device 5 can manage the illumination of one or more indicator lights 11, 13, 15 in at least one lighting display sequence. Lighting display sequence is understood to mean a set of indicator lights 11, 13, 15 being turned on with static lighting, or by being made to flash, or a combination of static lighting and flashing, and/or with a variable light intensity and/or depending on for turning-on and turning-off rules so as to define, for example, a light pattern, or even a movement of lights or light path, which can be done with a constant speed or not.

In particular, the driving assistance device 5 can manage the illumination of the indicator lights 11, 13, 15 in different lighting display sequences. For example, the driving assistance device 5 may manage the illumination of one of the indicator lights, for example the first indicator light 11, in a lighting display sequence when a level of driving automation is available. The driving assistance device 5 may also manage the illumination of another indicator light, for example the second indicator light 13, in another lighting display sequence, different to that of the first indicator light 11, when the driving assistance device 5 determines that the motor vehicle must be driven by the driver.

According to another example, the driving assistance device 5 (FIG. 1) can manage the illumination by making an indicator light flash to indicate an available level of automation. With reference to the particular example of the steering wheel that is shown schematically in FIG. 2*a*, the first indicator light 11 on the hub 71 can flash to indicate the available level of automation.

The driving assistance device 5 (FIG. 1) can notably manage the lighting by way of flashing at different frequencies. It can manage the lighting by making at least two indicator lights 11, 13, 15 flash at different frequencies, or making one and the same indicator light 11, 13, 15 flash at different frequencies upon a given command or in the course of various commands. For example, the flashing frequency can be increased when a rapid action on the part of the driver is desired. Non-limitingly, the flashing frequency may for example be about 0.5 Hz or 1 Hz.

Figure 3:
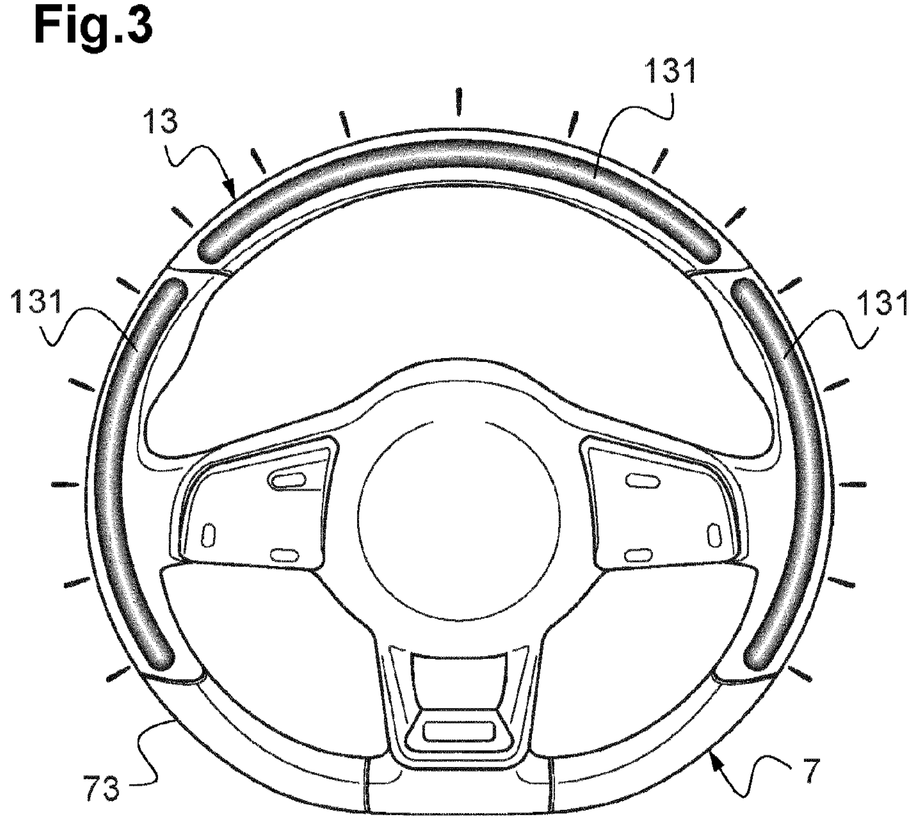
FIG. 3 shows the steering wheel with a second indicator light in a state of indicating a request for manual driving.

Considering the examples above, and non-limitingly, the driving assistance device 5 may manage the illumination by making the first indicator light 11 flash at a first frequency when a level of driving automation is available (FIG. 2*a*). It may manage the illumination by making the second indicator light 13 flash at a second frequency for a request for manual driving (FIG. 3). The second frequency may be greater than the first frequency. The first frequency is for example about 0.5 Hz (2 s between each repetition). The second frequency is for example about 1 Hz.

Referring again to FIG. 1, if there are multiple indicator lights 11, 13, 15, the driving assistance device 5 may manage the static illumination of at least one of the indicator lights 11, 13, 15 and at the same time manage the lighting of at least one other one of the indicator lights 11, 13, 15 by making it flash.

The driving assistance device 5 may manage the lighting of one or more indicator lights 11, 13, 15 in static fashion or by making it or them flash over a predefined period of time or until an action on the part of the driver is detected.

The driving assistance device 5 may manage the static lighting of the first indicator light 11 on the hub 71 of the steering wheel so as to indicate the active level of automation while the latter remains active. Non-exhaustively, this can be the case until the driver takes back control of the driving following emission of a request for manual driving or deliberately by the driver, or until an emergency stop maneuver is triggered or following such a maneuver, or even until a superior available level of automation is detected.

The driving assistance device 5 may manage the flashing of an indicator light 11, 13, 15 over a predefined period of time and stop the flashing at the end of this predefined period, notably when an action on the part of the driver is not essential for safety. This is the case notably when a level of automation is available. The driving assistance device 5 may stop the flashing at the end of the predefined period of time if the driver does not activate the available level of automation but prefers, for example, to keep the control of the driving manual. According to the preceding example in FIG. 2*a*, when a level of driving automation, notably the third or fourth level, is available, the driving assistance device 5 can manage the lighting by making the first indicator light 11 flash a predefined number of times, for example and non-limitingly four times.

Conversely, the driving assistance device 5 can manage the flashing of an indicator light 11, 13, 15 as long as an action on the part of the driver is not detected, notably for safety reasons.

This is the case for example when the vehicle is driven manually and when the driving assistance device 5 determines, on the basis of measurements taken by at least one on-board sensor, such as a DMS sensor, that the driver is distracted or sleepy; if a level of driving automation is available, such as the third or fourth level, the driving assistance device 5 can manage the flashing of an indicator light, such as the first indicator light 11, until the driver activates this available level of automation, for example by pressing on the control member 9.

According to another example, this may be the case when a level of automation is active and when the driving assistance device 5 determines that the driver must retake manual charge of the driving. According to the example shown schematically in FIGS. 5*a*, 5*b*, the first indicator light 11 is turned on statically to indicate the active level of automation, whereas the second indicator light 13 flashes until the driver retakes charge of the driving. The flashing frequency may be increased, for example from 0.5 Hz to 1 Hz, in order to prompt the driver all the more to take charge of the driving. The driving assistance device 5 may command the flashing of the first indicator light 11 to stop once the driving is controlled manually by the driver, notably by putting their hands back on the wheel, as shown schematically in FIG. 5*c*, and by deactivating the level of automation via the control member 9.

The driving assistance device 5 may manage the lighting of one or more indicator lights 11, 13, 15 in static fashion or by making it or them flash in different light intensities. The light intensity of a given indicator light can be varied depending on the information that is to be indicated. It can manage the lighting of one of the indicator lights with a predefined light intensity and manage the lighting of another indicator light with another, different light intensity.

With reference to FIGS. 1 to 2*b*, the driving assistance device 5 can manage the lighting of an indicator light, for example the first indicator light 11, with a first light intensity (FIG. 2*a*) when a level of automation is available and with a second light intensity (FIG. 2*b*), different than the first light intensity, when a level of automation is active. The first light intensity may be selected as lower than the second light intensity. The first light intensity is for example at 50%. The second light intensity is for example at 100%.

Figure 5A:
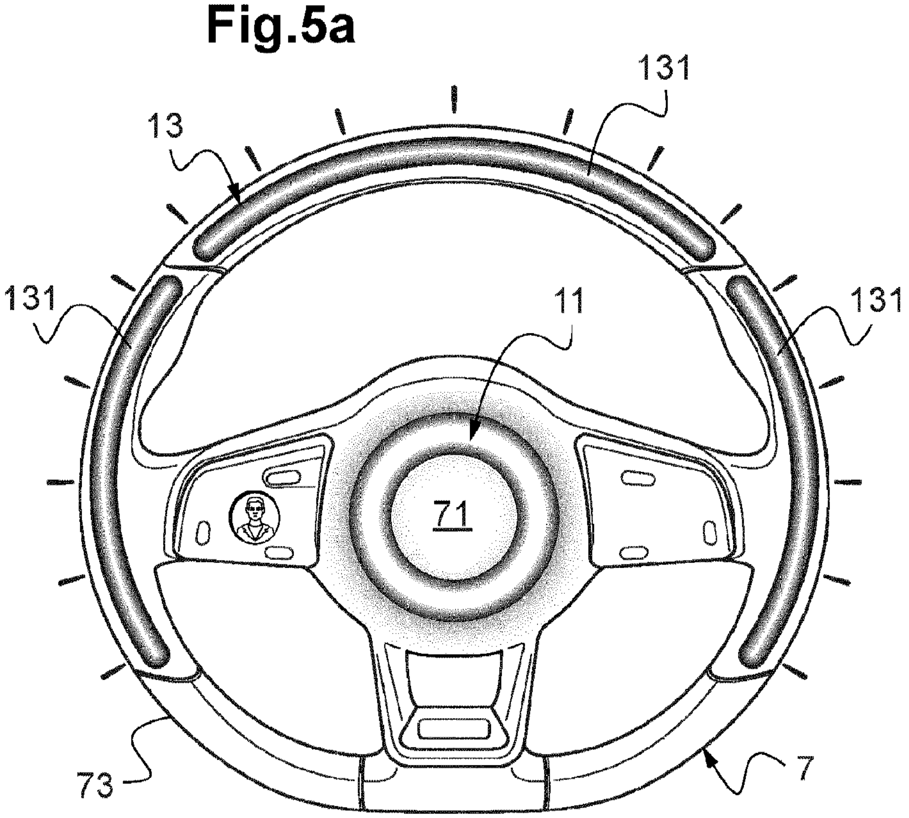
FIG. 5*a* depicts the steering wheel with the first indicator light indicating an active level of driving automation and the second indicator light indicating a request for manual driving with a first light intensity.
Figure 5B:
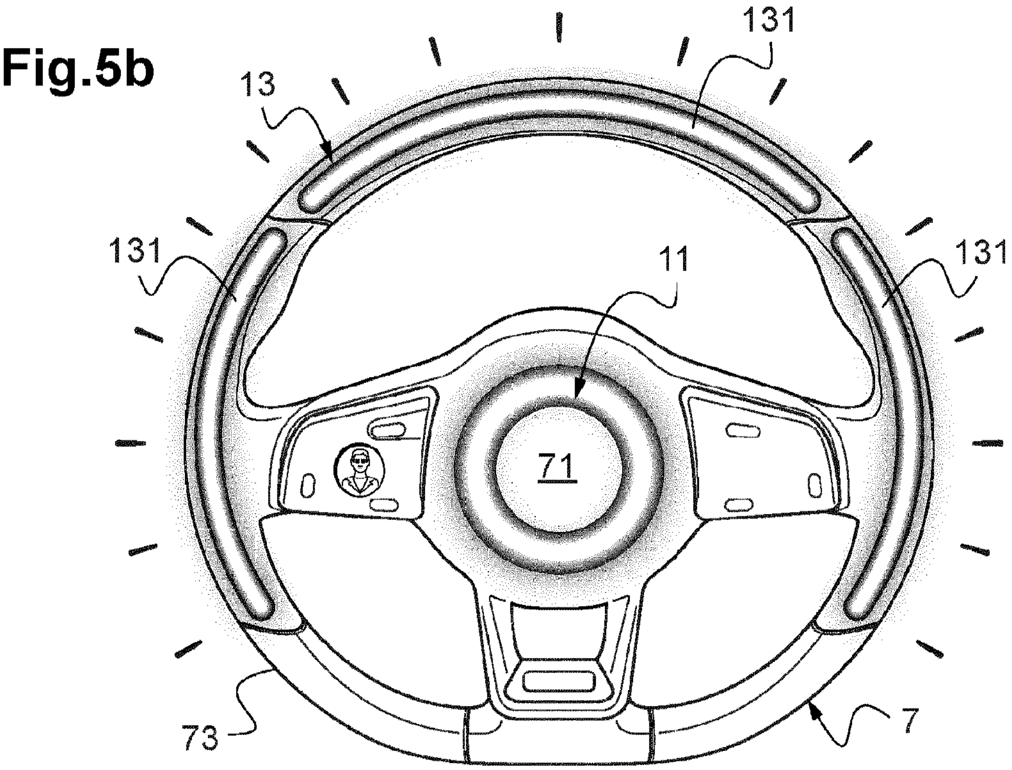
FIG. 5*b* depicts the steering wheel from FIG. 5*a*, the second indicator light of which has a second light intensity.
Figure 5C:
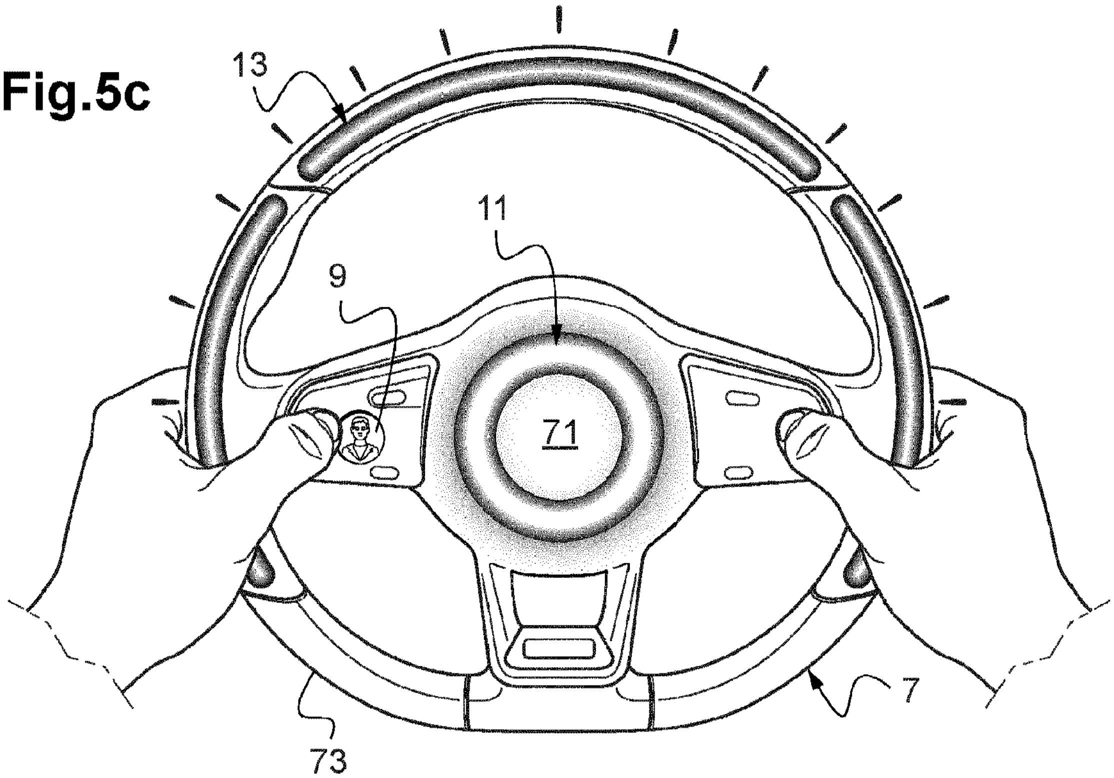
FIG. 5*c* schematically depicts an action involving the driver taking charge of the steering wheel from FIGS. 5*a*, 5*b*.

According to another example schematically shown in FIGS. 5*a*, 5*b*, the light intensity of an indicator light, for example the second indicator light 13, can alternate between a first light intensity (FIG. 5*a*) and a second light intensity (FIG. 5*b*), which is greater than the first light intensity, so as to obtain the flashing effect. For example, the light intensity may alternate between 50% and 100%.

Referring again to the example of FIGS. 5*a*, 5*b*, when the second indicator light 13 flashes alternately with a variable intensity, the first indicator light 11 for its part can be lit up with a second light intensity, for example at 100%, to indicate the active level of driving automation.

According to yet another example, when the motor vehicle V approaches limit operating conditions of the semi-automated or automated mode, the light intensity of one or more indicator lights 11, 13, 15 can vary depending on the threshold that is crossed. The light intensity can increase as an upper threshold is approached, and by contrast decrease as a lower threshold is approached.

Furthermore, the driving assistance device 5 is configured to manage at least one lighting display sequence of one or more indicator lights 11, 13, 15 so as to represent a changeover in responsibility for driving. The indicator light 11, 13, 15 may form an at least partially linear and/or circular light path. Other shapes are conceivable. During the lighting display sequence, the driving assistance device 5 can manage the lighting of one or more indicator lights 11, 13, 15 with a light intensity that changes until it reaches a predefined light intensity when the changeover in responsibility for driving is complete.

In a first lighting display sequence, at least one indicator light 11, 15 forms a light path in a first direction. This first direction is associated with a changeover in responsibility for driving from the driver to the automated management module 3. The light intensity of the one or more indicator lights 11, 15 may change during the changeover in responsibility for driving until it reaches a predefined light intensity (which may be zero or non-zero) when the changeover in responsibility for driving is complete, that is to say when the transfer of responsibility has taken place.

Figure 6A:
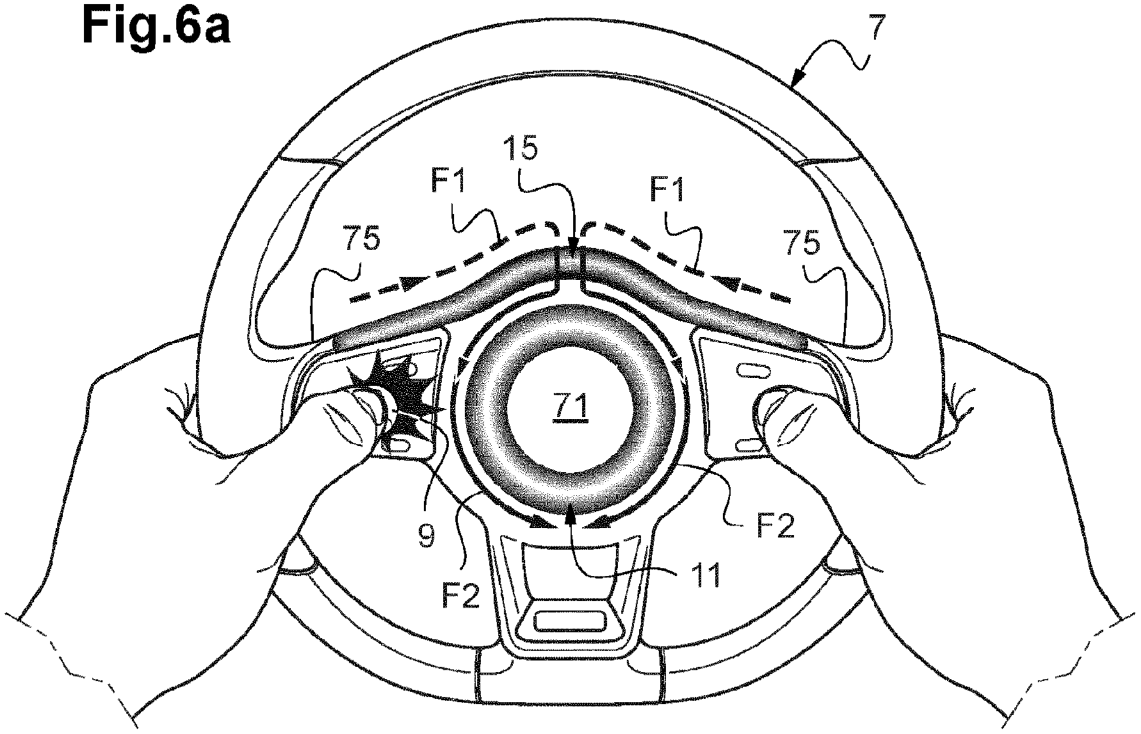
FIG. 6*a* schematically depicts a first lighting display sequence of the first and third indicator lights, with a first light intensity.
Figure 6B:
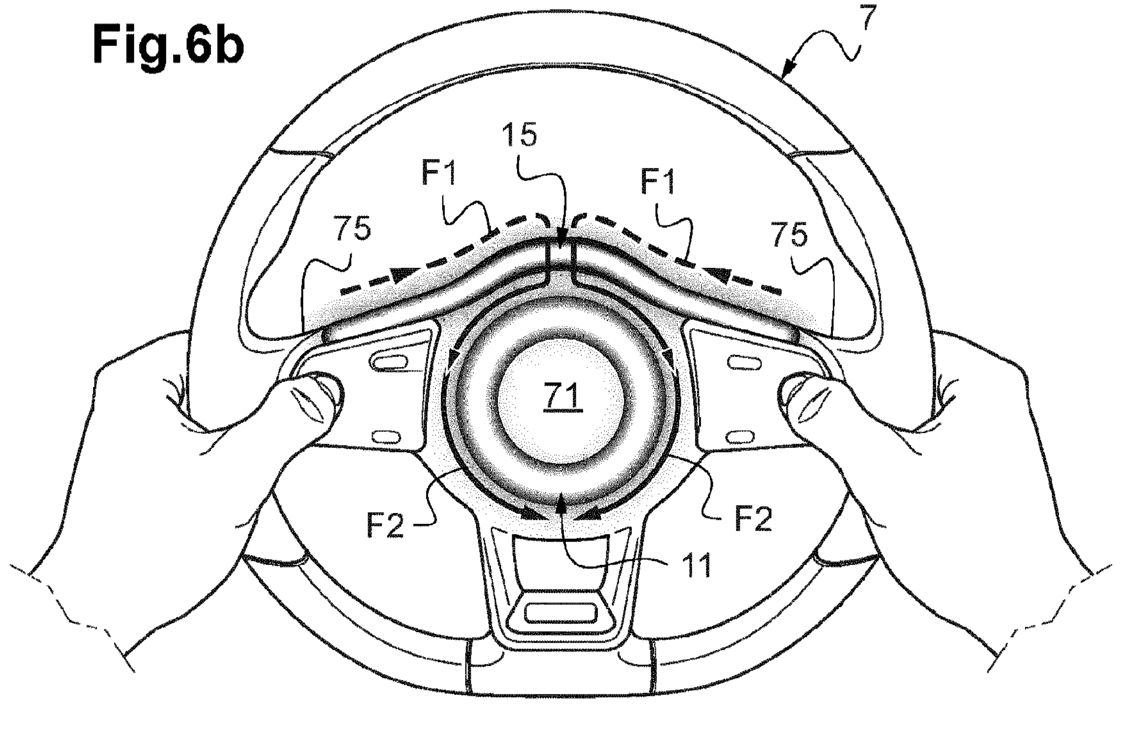
FIG. 6*b* schematically depicts the first lighting display sequence with a second light intensity.

A particular example of the first lighting display sequence is illustrated in FIGS. 6*a*, 6*b*. When a level of automation is available (for example the third or fourth level), as indicated by the first indicator light 11, a transfer of responsibility can be initiated when the driver presses on the control member 9 to activate the available level of automation, as shown in FIG. 6*a*. In order to indicate that the changeover in responsibility is in progress, the driving assistance device 5 first of all activates the gradual illumination of the third indicator light 15 in a display on the peripheral ring 73 toward the center, as shown schematically by the arrows F1, and then also activates the gradual illumination of the first indicator light 11 in a display on either side of a first central point on the arm forming the third region or between the two arms 75 as far as an opposite point, as shown schematically by the arrows F2. This gives the impression that the third indicator light 15 and then the first indicator light 11 gradually fill up with light. It is possible for the light intensity of the third indicator light 15 and/or of the first indicator light 11 not to be maximal; for example, it may be at 50%. While the driver keeps their hands on the steering wheel, the light intensity can remain at 50%.

When the driver releases the steering wheel, the changeover in responsibility for driving can be completed. For this, the driving assistance device 5 gradually reduces the illumination of the third indicator light 15 in a similar display from the peripheral ring 73 to the center, as schematically shown by the arrows F1 in FIG. 6*b*, until the illumination of the third indicator light 15 is turned off. The driving assistance device 5 also gradually increases the illumination of the first indicator light 11 in a similar display on either side of a first central point on the arm forming the third region or for example between the two arms 75 as far as an opposite point, as shown schematically by the arrows F2 in FIG. 6*b*, until it reaches a predefined light intensity, in this instance a maximum intensity at 100%, when the changeover in responsibility for driving is complete.

Figure 7:
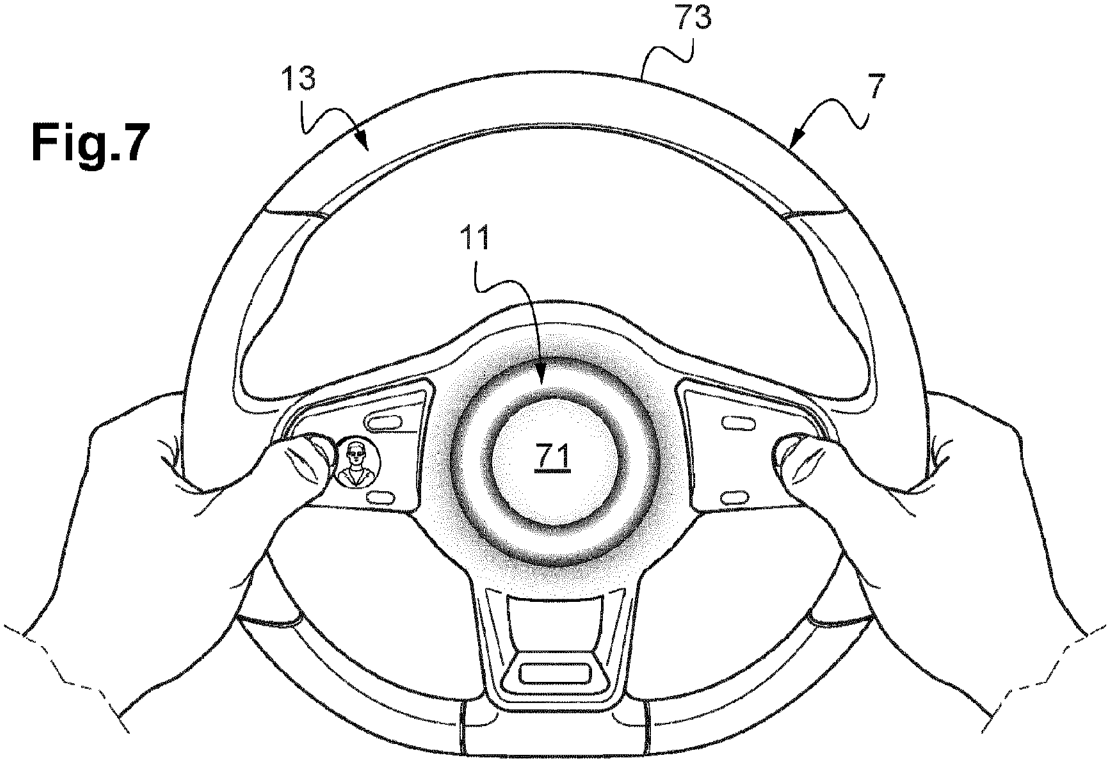
FIG. 7 schematically depicts an action of deactivating the active level of driving automation indicated by the first indicator light.

In the event of a changeover in responsibility for driving from the automated management module 3 to the driver, the driver must take back charge of the driving, as indicated by the second indicator light 13 (FIGS. 5*a*, 5*b*). The changeover in responsibility for driving from the automated management module to the driver can start when the driver puts their hands on the steering control member 7, such as the steering wheel (FIG. 5*c*), or acts on a brake pedal or accelerator pedal, and when they deactivate the ongoing level of automation, for example by pressing on the control member 9. When the user's hands are detected on the peripheral ring 73, the driving assistance device 5 commands the illumination of the second indicator light 13 to stop (FIG. 7).

A second lighting display sequence may be implemented. In a second lighting display sequence, at least one indicator light 15 forms a light path in a second direction. The second direction is opposite to the first direction. The light intensity of the one or more indicator lights 15 can decrease during the changeover in responsibility for driving until it reaches a light intensity of zero when the changeover in responsibility for driving is complete, that is to say that the transfer of responsibility has taken place and the driver has taken back charge of the driving.

Figure 8A:
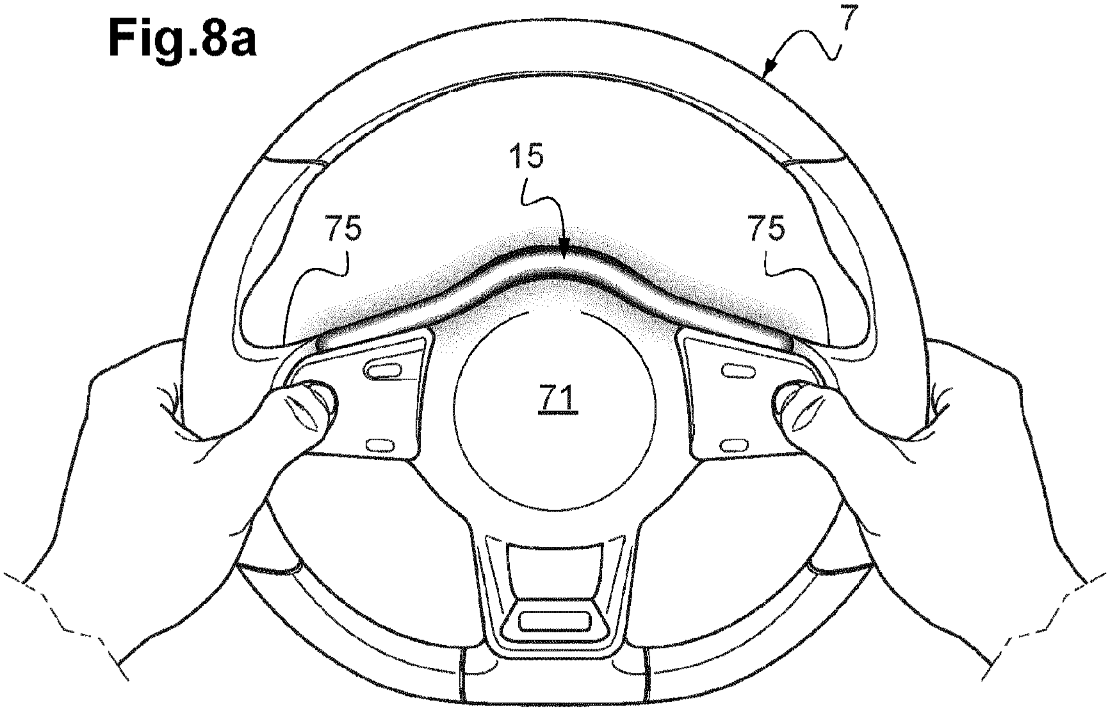
FIG. 8*a* shows a first step of illuminating the third indicator light during a second lighting display sequence.
Figure 8B:
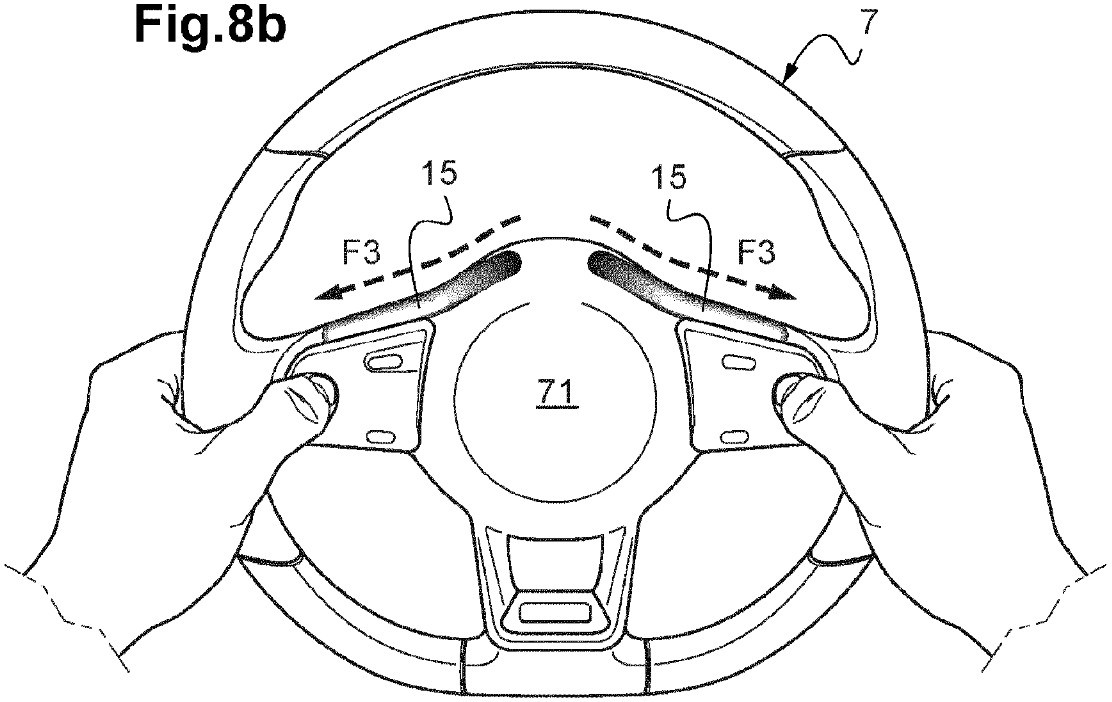
FIG. 8*b* shows a second step of gradually turning off the illumination of the third indicator light in the second lighting display sequence.
Figure 8C:
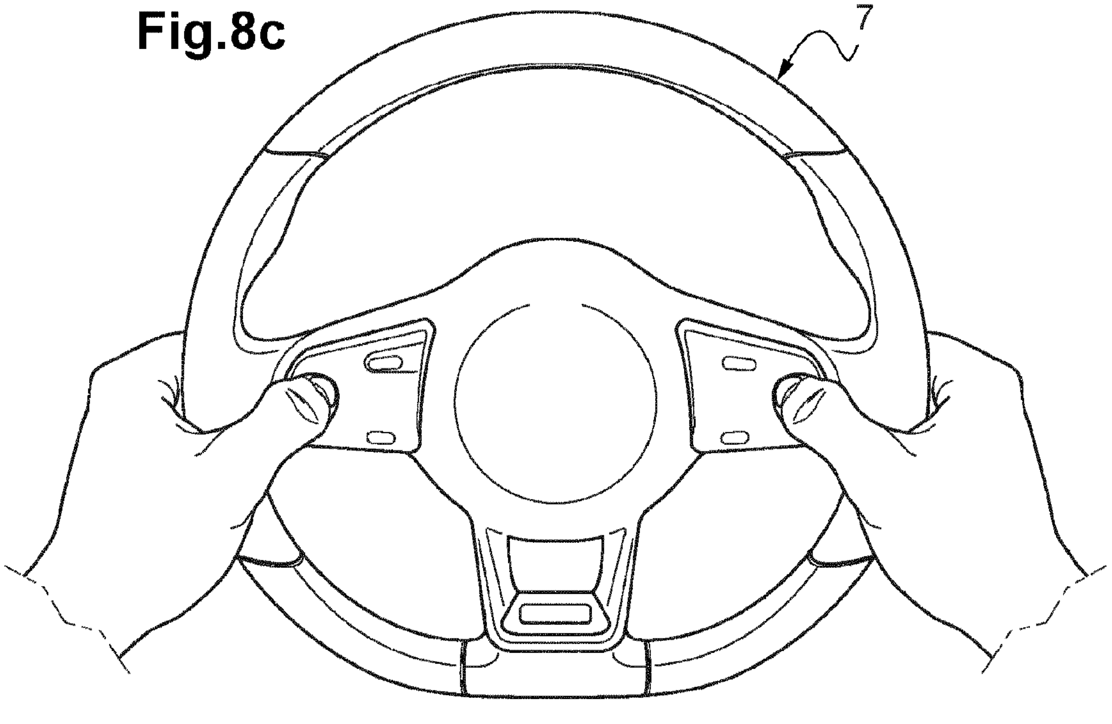
FIG. 8*c* depicts the steering wheel in a neutral state with all the indicator lights off at the end of the second lighting display sequence.

A particular example of the second lighting display sequence is illustrated in FIGS. 8*a* to 8*c*. In order to indicate that the changeover in responsibility is in progress, the driving assistance device 5 turns off the first indicator light 11 and activates the illumination of the third indicator light 15 (FIG. 8*a*). The light intensity of the third indicator light 15 is decreased gradually in a display which starts on either side of the center of the one or more arms 75 and goes toward the peripheral ring 73, as shown schematically by the arrows F3 in FIG. 8*b*. As a result, the third indicator light 15 gradually turns off, starting in the center, by contrast to the first lighting display sequence, until it turns off completely (FIG. 8*c*) when the changeover in responsibility for driving is complete.

Furthermore, if, in the case of a request for manual driving, the driver does not take back charge of the driving of the motor vehicle V after a predefined period of time, for example 10 s, 30 s or 60 s, the driving assistance device 5 can command an emergency stop maneuver. This maneuver can be done under the control of the automated management module 3, and in this case the first indicator light 11 stays lit up, for example in static fashion. In other cases, the automated management module 3 can be disengaged and the first indicator light 11 is turned off, such that the driver is responsible for the actions of the motor vehicle during such a maneuver.

Other variants of modifications to the state of the one or more indicator lights 11, 13, 15 on the steering control member 7 can be envisaged without departing from the scope of the present invention.

As a result, by virtue of the indicator lights 11, 13, 15, which are all arranged on the steering control member 7, all the information that is necessary to the driver, such as the state, that is to say if the driving is manual or if a level of automated driving is active or available, if they must take back charge of management of the driving, or even when a transfer of responsibility takes place, is presented and centralized on this single member, such as the steering wheel, which can always be seen by the driver even when the driving is automated. The illumination is adapted to the geometry of the steering wheel. In addition, when a transfer of responsibility for driving is initiated, the steps for this transfer, that is to say the changeover, are described in detail in the form of lighting display sequences. As a result, it is possible for the driver to know if the changeover is only halfway done, for example, or when it is complete. This makes it possible to avoid the driver misinterpreting who effectively has the responsibility for driving.

The invention claimed is:

1. A control system for controlling a motor vehicle configured to be driven in a manual mode by a driver without automated assistance or in different levels of driving automation by an automated management module of the control system, the control system comprising:

- a driving assistance device configured to analyze a road configuration of the motor vehicle so as to determine when a level of driving automation is available and to detect an active level of driving automation, and
- a steering control member configured to control steering of the motor vehicle, wherein:

the steering control member includes at least:

one first region provided with at least one first indicator light configured to indicate an available or active level of driving automation, one second region provided with at least one second indicator light configured to indicate at least one request for manual driving, and one third region provided with at least one third indicator light configured to indicate a changeover in responsibility for driving between the automated management module and the driver, and the driving assistance device is configured to modify a state of at least one of the indicator lights:

when the driving assistance device determines an available level of driving automation, so as to indicate the available level of driving automation that was determined, when the driving assistance device detects an active level of driving automation, so as to indicate the active level of driving automation that was detected, when the driving assistance device determines, depending on the road configuration, that the motor vehicle must be driven by the driver, so as to indicate at least one request for manual driving of the motor vehicle, and when the driving assistance device detects a switchover between a level of driving automation and the manual mode, so as to indicate a changeover in responsibility for driving between the automated management module and the driver, wherein the steering control member is a steering wheel including:

a hub provided with said at least one first indicator light, a peripheral ring provided with said at least one second indicator light, and two arms which connect the hub to the peripheral ring, said at least one third indicator light being provided symmetrically on the two arms, wherein the driving assistance device is configured to activate the at least one third indicator light in a sequence such that outer ends of the at least one third indicator light located on the two arms illuminates and then illumination progresses towards a center of the at least one third indicator light.

2. The control system as claimed in claim 1, wherein at least one of the indicator lights includes at least one light source configured to emit different colors of light, and wherein the driving assistance device is configured to manage an illumination of said at least one indicator light in a predefined color code.

3. The control system as claimed in claim 1, wherein at least one of the indicator lights includes at least one light source of variable intensity, and wherein the driving assistance device is configured to manage an illumination of said at least one indicator light with a first light intensity when a level of automation is available and with a second intensity, different than the first intensity, when a level of automation is active.

4. The control system as claimed in claim 1, wherein the driving assistance device is configured to manage:

an illumination of said at least one first indicator light in a lighting display sequence when a level of driving automation is available, and an illumination of said at least one second indicator light in another lighting display sequence when the driving assistance device determines that the motor vehicle must be driven by the driver.

5. The control system as claimed in claim 1, wherein the driving assistance device is configured to manage at least one lighting display sequence of at least one of the indicator lights representing the changeover of responsibility for driving.

6. The control system as claimed in claim 5, wherein the driving assistance device is configured to manage:

a first lighting display sequence such that said at least one indicator light forms a light path in a first direction, associated with a changeover in responsibility for driving from the driver to the automated management module, and a second lighting display sequence such that said at least one indicator light forms a light path in a second direction, associated with a changeover in responsibility for driving from the automated management module to the driver.

7. The control system as claimed in claim 3, wherein the driving assistance device is configured to manage a lighting display sequence of said at least one indicator light with a light intensity that changes during the changeover in responsibility for driving until the light intensity reaches a predefined light intensity when the changeover in responsibility for driving is complete.

8. A motor vehicle configured to be driven in a manual driving mode by a driver without automated assistance or in different levels of driving automation, the motor vehicle comprising the control system as claimed in claim 1.

9. The control system as claimed in claim 1, wherein said at least one first indicator light is provided only on the hub, and said at least one second indicator light is provided only on the peripheral ring.

10. The control system as claimed in claim 1, wherein, after a center of the at least one third indicator light is illuminated, a top center of the at least one first indicator light on the hub is illuminated, and then illumination progresses in the at least one first indicator light to a bottom center of the at least one first indicator light.

* * * * *